US009501253B2

(12) United States Patent
Inoue et al.

(10) Patent No.: US 9,501,253 B2
(45) Date of Patent: Nov. 22, 2016

(54) COMMUNICATION APPARATUS, CONTROL METHOD THEREOF, PRINTING APPARATUS, AND STORAGE MEDIUM

(71) Applicant: CANON KABUSHIKI KAISHA, Tokyo (JP)

(72) Inventors: Go Inoue, Fujisawa (JP); Hiroki Kawasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/730,811

(22) Filed: Jun. 4, 2015

(65) Prior Publication Data
US 2015/0268904 A1 Sep. 24, 2015

Related U.S. Application Data

(62) Division of application No. 14/196,321, filed on Mar. 4, 2014, now abandoned.

(30) Foreign Application Priority Data

Mar. 15, 2013 (JP) ................. 2013-054142

(51) Int. Cl.
G06F 15/00 (2006.01)
G06F 3/12 (2006.01)
H04W 40/00 (2009.01)

(52) U.S. Cl.
CPC .......... *G06F 3/1238* (2013.01); *G06F 3/1221* (2013.01); *G06F 3/1229* (2013.01); *G06F 3/1236* (2013.01); *G06F 3/1292* (2013.01); *H04W 40/00* (2013.01); *H04N 2201/0094* (2013.01); *Y02B 60/1271* (2013.01); *Y02B 60/50* (2013.01)

(58) Field of Classification Search
CPC ................. H04N 2201/0094; Y02B 60/1271; H04W 40/00
See application file for complete search history.

(56) References Cited

U.S. PATENT DOCUMENTS

| 8,896,874 | B2 | 11/2014 | Inoue | 358/1.15 |
| 2001/0004242 | A1 | 6/2001 | Izumi | |
| 2009/0103124 | A1* | 4/2009 | Kimura | G06F 3/1204 358/1.15 |
| 2011/0292445 | A1 | 12/2011 | Kato | 358/1.15 |
| 2012/0033245 | A1* | 2/2012 | Kurahashi | G06F 3/1204 358/1.14 |
| 2012/0127523 | A1 | 5/2012 | Terashita | |
| 2014/0160522 | A1 | 6/2014 | Kawasaki | 358/1.15 |

FOREIGN PATENT DOCUMENTS

| CN | 101547281 A1 | 9/2009 |
| CN | 102356627 A | 2/2012 |
| CN | 102638635 A | 8/2012 |
| JP | 2012-113349 A | 6/2012 |

OTHER PUBLICATIONS counterpart office action, Chinese Application No. 201410097980. 1, dated Apr. 27, 2016.

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A communication apparatus (a printing apparatus 100) according to an aspect of the present invention controls communication with an external apparatus in one of a first wireless communication mode (or a wired communication mode) and a second wireless communication mode. In the case where the communication mode is set to the second wireless communication mode, the printing apparatus 100 switches the communication mode to the first wireless communication mode (or the wired communication mode) when an operation state of the printing apparatus 100 shifts to another state such as a power saving state.

11 Claims, 13 Drawing Sheets

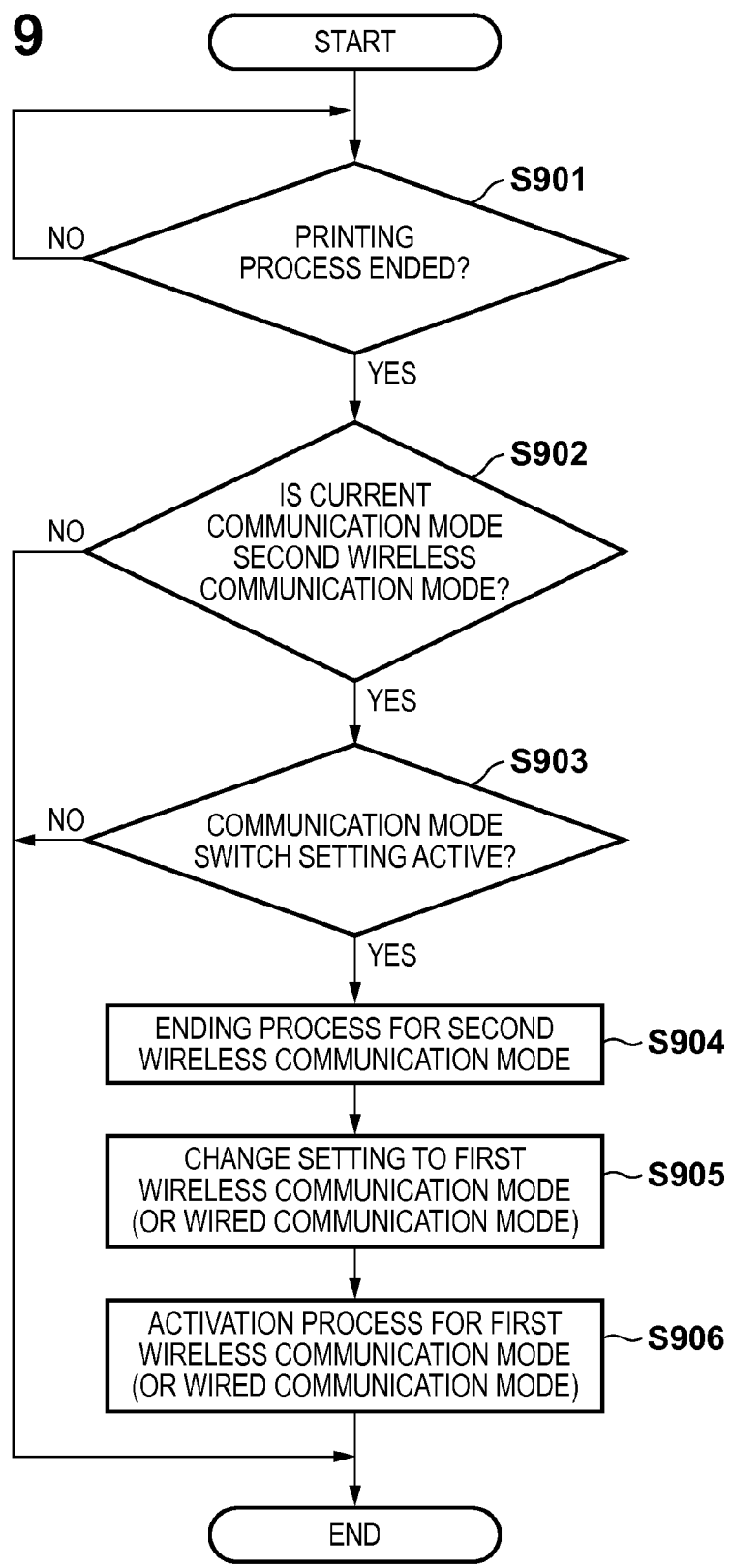

COMMUNICATION APPARATUS, CONTROL METHOD THEREOF, PRINTING APPARATUS, AND STORAGE MEDIUM

CROSS REFERENCE TO RELATED APPLICATION

This application is a division of U.S. application Ser. No. 14/196,321, filed on Mar. 4, 2014 the entire disclosure of which is hereby incorporated by reference herein.

BACKGROUND OF THE INVENTION

Field of the Invention

The present invention relates to communication apparatuses capable of wireless communication with an external apparatus such as a mobile terminal, a PC, or the like, and to control methods thereof, printing apparatuses, and storage media.

Description of the Related Art

Recent years have seen an increase in printing apparatuses, such as multifunction peripherals, printers, and the like, that include wireless LAN functionality. A printing apparatus that includes wireless LAN functionality can connect wirelessly to an access point as a client using an infrastructure mode. Meanwhile, by using the infrastructure mode to communicate with the printing apparatus via the access point, PCs, mobile terminals, and the like can cause the printing apparatus to execute printing by sending print data thereto, and the PCs, mobile terminals, and the like can then be used to manage the printing apparatus by receiving device information from the printing apparatus.

Related to the aforementioned wireless LAN, the Wi-Fi Alliance has established a standard called Wi-Fi Direct®. Wi-Fi Direct defines a protocol for determining whether a wireless terminal will function as an access point or as a client. Which wireless terminal will function as an access point and which wireless terminal will function as a client can be determined automatically by executing this protocol. Using Wi-Fi Direct enables one of the wireless terminals to function as an access point automatically without needing to prepare a separate access point, which makes it possible for wireless terminals to wirelessly communicate with each other directly. Furthermore, using Wi-Fi Direct makes it possible to execute various types of application services (image sharing, printing, and the like) among wireless terminals.

Wi-Fi Direct-compliant printing apparatuses are configured so that a user can use a console or the like to manually instruct whether to use Wi-Fi Direct, or to use the infrastructure mode for wireless communication via a third-party access point, as a communication mode for communicating wirelessly with a communication partner. Such printing apparatuses are normally configured to use the infrastructure mode so that multiple users can use the printing apparatus. When it is necessary to use Wi-Fi Direct as the communication mode, a user may temporarily switch the communication mode of the printing apparatus from the infrastructure mode to Wi-Fi Direct and then return the communication mode to the infrastructure mode once the desired tasks have been completed.

However, such a printing apparatus has a problem in that if a given user forgets to return the communication mode to the infrastructure mode after temporarily using Wi-Fi Direct, other users who have been using the printing apparatus in the infrastructure mode will be rendered unable to use the printing apparatus. To solve this problem, the printing apparatus may, for example, automatically switch the communication mode from Wi-Fi Direct to the infrastructure mode rather than waiting for a user to instruct the communication mode to be switched.

Japanese Patent Laid-Open No. 2012-113349 proposes a method for automatically switching a communication mode in a printing apparatus. This document discloses a printing apparatus, capable of using the stated infrastructure mode or an ad-hoc mode for communicating directly with the terminal apparatus without going through an access point, that automatically switches the communication mode when communicating wirelessly with a terminal apparatus. Specifically, in the case where the printing apparatus is operating in the ad-hoc mode and a given instance of print data has not been received for a predetermined amount of time after printing has been completed based on a different instance of print data received from a terminal apparatus, the communication mode is automatically returned to the infrastructure mode. In this manner, the printing apparatus disclosed in Japanese Patent Laid-Open No. 2012-113349 automatically switches the communication mode from the ad-hoc mode to the infrastructure mode depending on the communication partner or the state of communication with the communication partner.

However, with the stated printing apparatus (communication apparatus), a situation can arise where it is desirable to automatically switch the communication mode at a timing based on an operation state of the printing apparatus regardless of the communication partner or the state of communication with the communication partner.

For example, recent printing apparatuses typically have power-saving functions for reducing power consumption by shifting from a normal operation state to a power saving state in which power is only supplied to some devices, such as a CPU, a memory, or the like. Such printing apparatuses shift from the normal operation state to the power saving state in the case where an instruction from a user has been received via an operation unit such as a console, the case where an instruction has been received from a server or the like via a network, the case where an idle state has continued for a predetermined amount of time, and so on. If a printing apparatus that has a power-saving function shifts from the normal operation state to the power saving state while operating using Wi-Fi Direct, the apparatus will continue to use Wi-Fi Direct in the power saving state as long as there is no event that shifts the apparatus back to the normal operation state. In such a situation, there is a problem in that a user who is using the printing apparatus through wireless communication in the infrastructure mode will be rendered unable to use the printing apparatus.

SUMMARY OF THE INVENTION

The present invention has been achieved in light of the above-mentioned problems. The present invention provides a technique for automatically switching a communication mode of a communication apparatus (a printing apparatus) at an appropriate timing based on an operation state of the communication apparatus itself.

According to one aspect of the present invention, there is provided a communication apparatus that communicates with an external apparatus, the communication apparatus comprising: a communication control unit configured to control communication with the external apparatus in one of a first communication mode in which the communication apparatus communicates with the external apparatus without connecting to the external apparatus directly and a second communication mode in which the communication apparatus communicates with the external apparatus by wirelessly connecting to the external apparatus directly; and a switching unit configured to switch a communication mode from the second communication mode to the first communication mode, in a case where the communication mode is set to the second communication mode when an operation state of the communication apparatus shifts from a first state to a second state that is different from the first state.

According to another aspect of the present invention, there is provided a printing apparatus comprising: a communication apparatus that communicates with an external apparatus; and a printing unit configured to execute printing based on print data received by the communication apparatus from the external apparatus by communicating with the external apparatus, wherein the communication apparatus comprises: a communication control unit configured to control communication with the external apparatus in one of a first communication mode in which the communication apparatus communicates with the external apparatus without connecting to the external apparatus directly and a second communication mode in which the communication apparatus communicates with the external apparatus by wirelessly connecting to the external apparatus directly; and a switching unit configured to switch a communication mode from the second communication mode to the first communication mode, in a case where the communication mode is set to the second communication mode when an operation state of the communication apparatus shifts from a first state to a second state that is different from the first state.

According to still another aspect of the present invention, there is provided a control method for a communication apparatus that communicates with an external apparatus, the method comprising steps of: controlling communication with the external apparatus in one of a first communication mode in which the communication apparatus communicates with the external apparatus without connecting to the external apparatus directly and a second communication mode in which the communication apparatus communicates with the external apparatus by wirelessly connecting to the external apparatus directly; and switching a communication mode from the second communication mode to the first communication mode, in a case where the communication mode is set to the second communication mode when an operation state of the communication apparatus shifts from a first state to a second state that is different from the first state.

According to yet another aspect of the present invention, there is provided a non-transitory computer-readable storage medium storing a computer program for causing a computer to execute steps of a control method for a communication apparatus that communicates with an external apparatus, the method comprising steps of: controlling communication with the external apparatus in one of a first communication mode in which the communication apparatus communicates with the external apparatus without connecting to the external apparatus directly and a second communication mode in which the communication apparatus communicates with the external apparatus by wirelessly connecting to the external apparatus directly; and switching a communication mode from the second communication mode to the first communication mode, in a case where the communication mode is set to the second communication mode when an operation state of the communication apparatus shifts from a first state to a second state that is different from the first state.

According to the present invention, it is possible to provide a technique for automatically switching a communication mode of a communication apparatus (a printing apparatus) at an appropriate timing based on an operation state of the communication apparatus itself. Accordingly, even in the case where a user who used a second communication mode has forgotten to switch the communication mode setting, the communication apparatus automatically returns the communication mode to a first communication mode based on the operation state of the communication apparatus, and thus a situation in which another user is rendered unable to use the communication apparatus in the first communication mode can be avoided.

Further features of the present invention will become apparent from the following description of exemplary embodiments (with reference to the attached drawings).

BRIEF DESCRIPTION OF THE DRAWINGS

FIG. 9 is a flowchart illustrating a process for switching a communication mode executed by a printing apparatus according to the fourth embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Wi-Fi Direct

Figure 1:
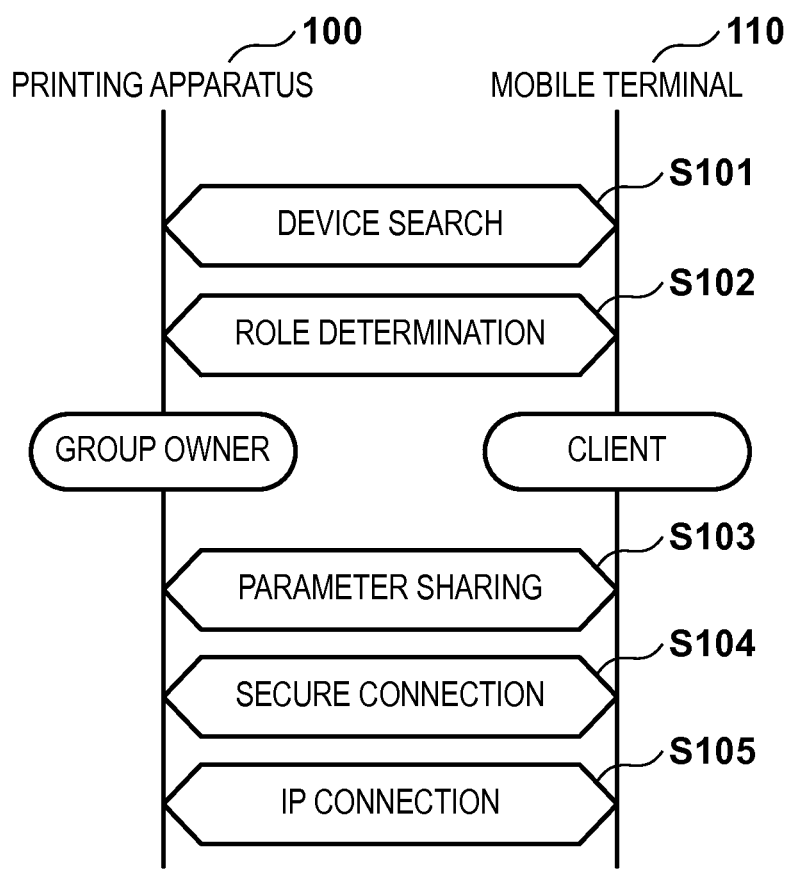
FIG. 1 is a diagram illustrating a Wi-Fi Direct processing sequence.

First, a Wi-Fi Direct processing sequence will be described with reference to FIG. 1. It is assumed here that a printing apparatus 100 and a mobile terminal 110 both support Wi-Fi Direct.

First, in S101, the printing apparatus 100 and the mobile terminal 110 each execute a device search for detecting a communication partner. The printing apparatus 100 and the mobile terminal 110 each search for nearby communication terminals that are attempting to connect wirelessly through Wi-Fi Direct. When the communication partner is detected as a result of the device search, in S102, it is determined which of the printing apparatus 100 and the mobile terminal 110 will serve as a GroupOwner (access point) and which will serve as a client (role determination). In FIG. 1, it is assumed that the role determination carried out in S102 results in the printing apparatus serving as the access point and the mobile terminal serving as a client.

Then, in S103, the printing apparatus 100, which serves as the access point, provides parameters for wireless connection to the mobile terminal 110, which serves as the client, using WPS (Wi-Fi Protected Setup), defined by the Wi-Fi Alliance. The parameters are shared between printing apparatus 100 and the mobile terminal 110 as a result. Then, in S104, a secure connection is established between the printing apparatus 100 and the mobile terminal 110 using the stated parameters.

Once the secure connection is established, in S105, addressing is carried out between the printing apparatus 100 and the mobile terminal 110 through IP communication. Here, the printing apparatus 100, which is serving as the access point, functions as a DHCP server, and assigns an IP address to the mobile terminal 110, which is serving as the client.

By carrying out the aforementioned process, Wi-Fi Direct can be used to establish wireless communication between the printing apparatus 100 and the mobile terminal 110. Employing this type of wireless communication makes it possible for the printing apparatus 100 and mobile terminal 110 to communicate directly without preparing a separate access point. For example, an application service provided in the printing apparatus 100 can communicate directly with an application service provided in the mobile terminal 110.

Hardware Configuration of Printing Apparatus

Figure 2:
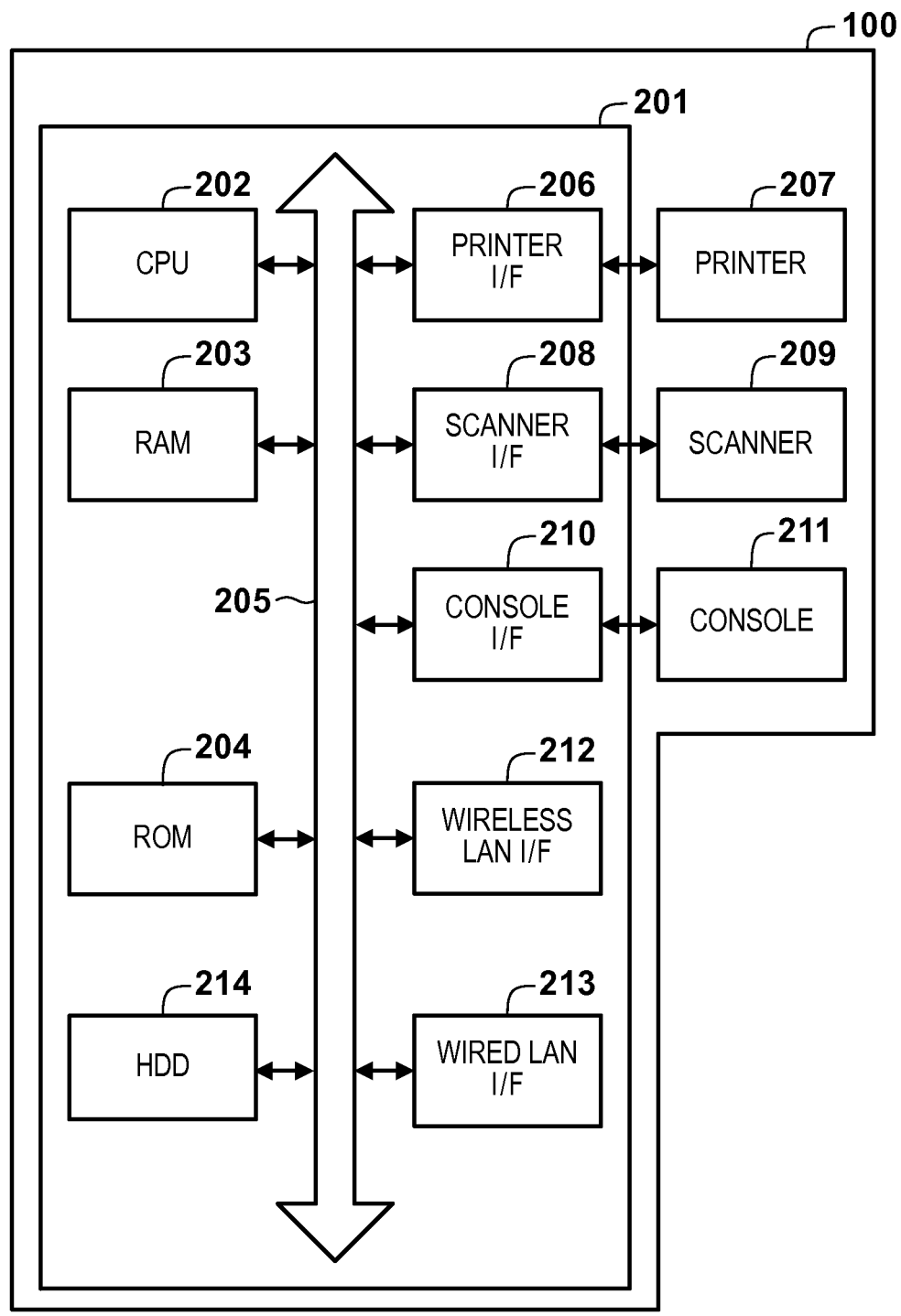
FIG. 2 is a block diagram illustrating the hardware configuration of a printing apparatus according to an embodiment of the present invention.

Next, the hardware configuration of the printing apparatus 100 according to an embodiment of the present invention will be described with reference to FIG. 2. The printing apparatus 100 is an example of a communication apparatus capable of executing wireless communication with an external apparatus such as a mobile terminal, a PC, or the like. Although the present embodiment describes the printing apparatus 100 as being a multifunction peripheral, the printing apparatus 100 may also be a printer that has a function for communicating with an external apparatus but does not include a scanner. Alternatively, the printing apparatus 100 may be a scanner that has a function for communicating with an external apparatus but does not include a printer. In other words, the present invention can be applied in any communication apparatus that has a function for communicating with an external apparatus.

The printing apparatus 100 includes a controller 201, a printer 207, a scanner 209, and a console 211. The controller 201 includes a CPU 202, a RAM 203, a ROM 204, an HDD 214, a printer I/F 206, a scanner I/F 208, a console I/F 210, a wireless LAN I/F 212, and a wired LAN I/F 213. The various devices in the controller 201 are connected to each other via a system bus 205.

The controller 201 that includes the CPU 202 controls the operations of the printing apparatus 100 as a whole. The CPU 202 carries out various types of control, such as communication control and the like, by reading out and executing control programs stored in the ROM 204. The RAM 203 is used as the main memory of the CPU 202, a temporary storage region such as a work area, or the like. The HDD 214 stores data, various types of programs, or various types of information tables.

The printer I/F 206 connects the printer 207 (a printer engine) to the controller 201. The printer 207 executes a printing process on the sheet supplied from a paper cassette (not shown) based on print data input via the printer I/F 206. The scanner I/F 208 connects the scanner 209 to the controller 201. The scanner 209 reads a document that has been placed thereon, generates image data, and outputs the image data. The image data output from the scanner 209 is printed by the printer 207, stored in HDD 214, sent to the external apparatus via the wireless LAN I/F 212 or the wired LAN I/F 213, or the like.

The console I/F 210 connects the console 211 to the controller 201. The console 211 includes a liquid-crystal display unit having touch panel functionality, a keyboard, various types of function keys, and so on (as will be described later with reference to FIG. 4A and FIG. 4B). A user can check screens displayed in the console 211, and can input various instructions to the printing apparatus 100 using the touch panel.

The wireless LAN I/F 212 executes wireless communication with the external apparatus, such as a mobile terminal, a PC, or the like. Likewise, the wired LAN I/F 213 connects to a LAN cable (not shown) and executes communication (wired communication) with the external apparatus. The printing apparatus 100 can send various types of information to the external apparatus and can receive various types of information from the external apparatus by communicating wirelessly via the wireless LAN I/F 212 or communicating over wires via the wired LAN I/F 213. For example, the printing apparatus 100 can receive print data from the external apparatus, and can cause the printer 207 to execute a printing process based on the received print data. The printing apparatus 100 can also send image data generated by the scanner 209 to the external apparatus.

Software Configuration of Printing Apparatus

Figure 3:
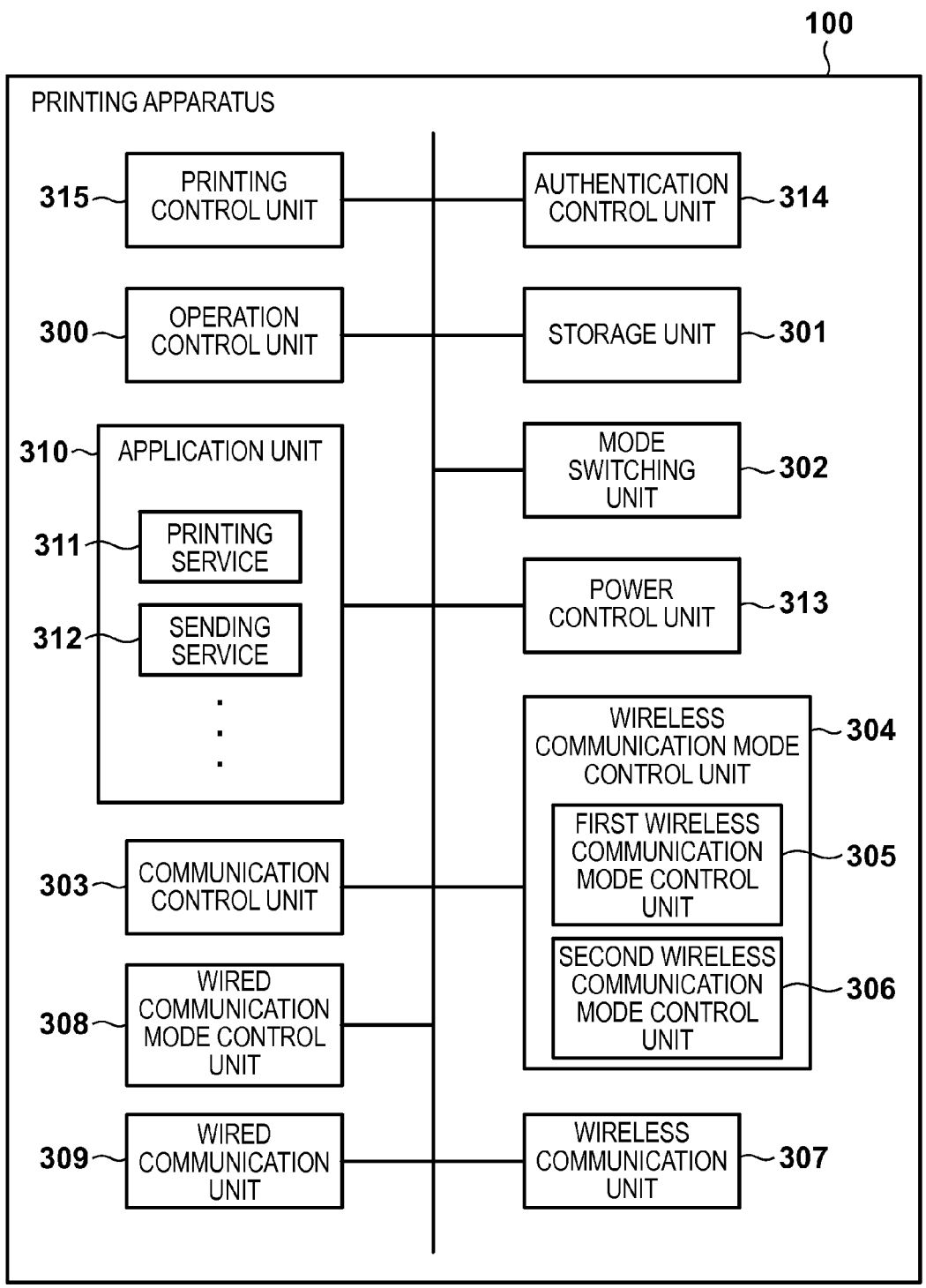
FIG. 3 is a block diagram illustrating the software configuration of a communication apparatus according to an embodiment of the present invention.

Next, the software configuration of the printing apparatus 100 will be described with reference to FIG. 3. The various functional units shown in FIG. 3 are realized in the printing apparatus 100 by the CPU 202 executing control programs that have been loaded into the RAM 203 from the ROM 204 or the HDD 214.

An operation control unit 300 controls the console 211. The operation control unit 300 displays an operation menu in the console 211 and accepts the input of instructions from the user, notifies other functional units of the details of the instructions accepted through the console 211, and displays results of the instructions in the console 211. A storage unit 301 stores designated data in the RAM 203 or the HDD 214 or reads out data stored in the RAM 203 or the HDD 214 in response to instructions from other functional units.

A mode switching unit 302 executes a process for switching communication modes of the printing apparatus 100. The communication modes include a mode in which communication is carried out over a wired LAN via the wired LAN I/F 213 (a wired communication mode) and modes in which communication is carried out over a wireless LAN via the wireless LAN I/F 212 (wireless communication modes).

The wireless communication modes include a first wireless communication mode and a second wireless communication mode.

The first wireless communication mode is a communication mode in which the printing apparatus 100 wirelessly communicates with an external apparatus such as the mobile terminal 110 via an access point (not shown) that is separate from the printing apparatus 100 and the mobile terminal 110. The second wireless communication mode, meanwhile, is a communication mode in which the printing apparatus 100 wirelessly communicates with an external apparatus such as the mobile terminal 110 directly, using Wi-Fi Direct. In the second wireless communication mode, when the printing apparatus 100 communicates with the mobile terminal 110, for example, one of the printing apparatus 100 and the mobile terminal 110 functions as the access point, and the other as a client. As a result, the printing apparatus 100 and the mobile terminal 110 connect wirelessly and communicate with each other directly.

A communication control unit 303 carries out communication control when the printing apparatus 100 communicates with an external apparatus such as the mobile terminal 110. Specifically, the communication control unit 303 passes data, that is to be sent to the external apparatus, from an application unit 310 to a wireless communication unit 307 or a wired communication unit 309, and causes the data to be sent to the external apparatus. In addition, the communication control unit 303 passes data received via the wireless communication unit 307 or the wired communication unit 309 to the application unit 310.

The wireless communication unit 307 controls the wireless LAN I/F 212, and in the case where the printing apparatus 100 is operating in a wireless communication mode, sends and receives data when the application unit 310 communicates with an external apparatus such as the mobile terminal 110. Likewise, the wired communication unit 309 controls the wired LAN I/F 213, and in the case where the printing apparatus 100 is operating in the wired communication mode, sends and receives data when the application unit 310 communicates with the external apparatus.

A wireless communication mode control unit 304 executes control (an activation process, an ending process, and so on) related to the wireless communication modes (the first wireless communication mode and the second wireless communication mode). The wireless communication mode control unit 304 includes a first wireless communication mode control unit 305 and a second wireless communication mode control unit 306. The first wireless communication mode control unit 305 executes control (an activation process, an ending process, and so on) related to the communication mode when the printing apparatus 100 is operating in the first wireless communication mode. Likewise, the second wireless communication mode control unit 306 executes control related to the communication mode when the printing apparatus 100 is operating in the second wireless communication mode (Wi-Fi Direct). A wired communication mode control unit 308 executes control related to the communication mode when the printing apparatus 100 is operating in the wired communication mode.

A power control unit 313 determines whether or not to shift the printing apparatus 100 to a power saving state in which less power is consumed by the printing apparatus 100 than in a normal power state, or to a shut down state, and controls a power supply to devices such as the CPU 202 and the HDD 214 in accordance with a result of the determination. A printing control unit 315 sends print data and instructions to start printing to the printer 207 and receives a notification that printing has ended from the printer 207 via the printer I/F 206.

The application unit 310 includes various types of services, such as a printing service 311, a sending (SEND) service 312, and so on. The printing service 311 accepts, via the communication control unit 303, print data received from the external apparatus by the wireless communication unit 307 or the wired communication unit 309, and causes the printing control unit 315 to output that print data to the printer 207 via the printer I/F 206. Through this, the printing service 311 executes a service for printing an image on a sheet based on the print data. The sending service 312 executes a sending service by passing image data (scan data) received from the scanner 209 via the scanner I/F 208 to the communication control unit 303 and sending the image data to the external apparatus through the wireless communication unit 307 or the wired communication unit 309.

An authentication control unit 314 reads user login information received through the console 211 or an external card reader, verifies that information against user login information saved in the HDD 214 or the like by the storage unit 301, and determines whether or not to allow the user to log in. In the case where the login authentication is successful, the authentication control unit 314 enables the printing apparatus 100 to be operated. However, in the case where the login authentication has failed, the authentication control unit 314 displays a notification of the authentication failure in the console 211, and continues to prevent the printing apparatus 100 from being operated. Furthermore, the authentication control unit 314 reads user logout information via the console 211 or the external card reader and sets the printing apparatus 100 to a state in which the printing apparatus 100 cannot be operated.

Note that it is necessary for the application unit 310 and the communication control unit 303 to be capable of simultaneous use in a plurality of communication modes in order for the printing apparatus 100 to use two or more of the wired communication mode, the first wireless communication mode, and the second wireless communication mode simultaneously. However, depending on the printing apparatus, there are cases where the included application unit 310 and communication control unit 303 are not capable of simultaneous use in a plurality of communication modes. Such a printing apparatus operates so that one of the wired communication mode, the first wireless communication mode, and the second wireless communication mode is used exclusively. In this case, which communication mode the printing apparatus is to use can be selected by the user via the console 211.

Console and Settings Screen

Next, the configuration of the console 211 of the printing apparatus 100 and screens displayed in the console 211 will be described with reference to FIG. 4A and FIG. 4B. The printing apparatus 100 according to the present embodiment has a scanning function provided by the scanner 209, a copy function provided by the printer 207 and the scanner 209, and so on. The printing apparatus 100 further includes a function for printing in response to an instruction received from an external apparatus such as the mobile terminal 110 via the wireless LAN I/F 212 or the wired LAN I/F 213.

The console 211 includes a copy function button 401 and a scanning function button 402 as keys for selecting the aforementioned functions. The user can use a function of the printing apparatus 100 by depressing the button corresponding to the function to be used. In addition, the console 211 includes a display unit 403 for notifying the user of information indicating the status of settings, the status of the printing apparatus 100, and so on.

Arrow keys 404 are used to move a cursor or the like displayed in the display unit 403. The arrow keys 404 include four buttons corresponding to the up, down, left, and right directions. An OK key 405 is disposed in the center of the arrow keys 404, and functions as a "set" key for making instructions regarding settings, inquiries, and the like. For example, in the case where the user wishes to change settings for copying (the paper size, for example), the user depresses the copy function button 401, and a copy function screen is displayed in the display unit 403. When the user then uses the arrow keys 404 to select an item to be changed (the paper size) from the items displayed in the copy function screen and depresses the OK key 405, the display in the display unit 403 transitions to a settings screen in which the user can select settings. By manipulating the arrow keys 404 in order to move the cursor to a position of the settings screen corresponding to the desired settings and then depressing the OK key 405, the user can finalize that setting. A numerical keypad 406 is used to input numerical values, such as a number of copies.

The console 211 is further provided with a black-and-white start key 407 and a color start key 408, which serve as keys for instructing copying or scanning to start. Note that the color start key 408 is unnecessary in the case where the printing apparatus 100 lacks a color copy function and has only a black-and-white copy function. Likewise, the color start key 408 is unnecessary in the case where the printing apparatus 100 lacks a function for discriminating between color documents and black-and-white documents and has only a function for reading documents in black-and-white.

A stop key 409 is a key for instructing the printing apparatus 100 to stop (cancel) execution of the various functions. Note that the user can cause a status confirmation screen regarding the operation (process) the printing apparatus 100 is currently executing to be displayed in the display unit 403 by manipulating a status confirmation/cancel key 410. The process being executed can also be stopped (canceled) by the user using the arrow keys 404 and the OK key 405 to select the process whose execution is to be stopped (canceled) in the displayed status confirmation screen.

Figure 4A:
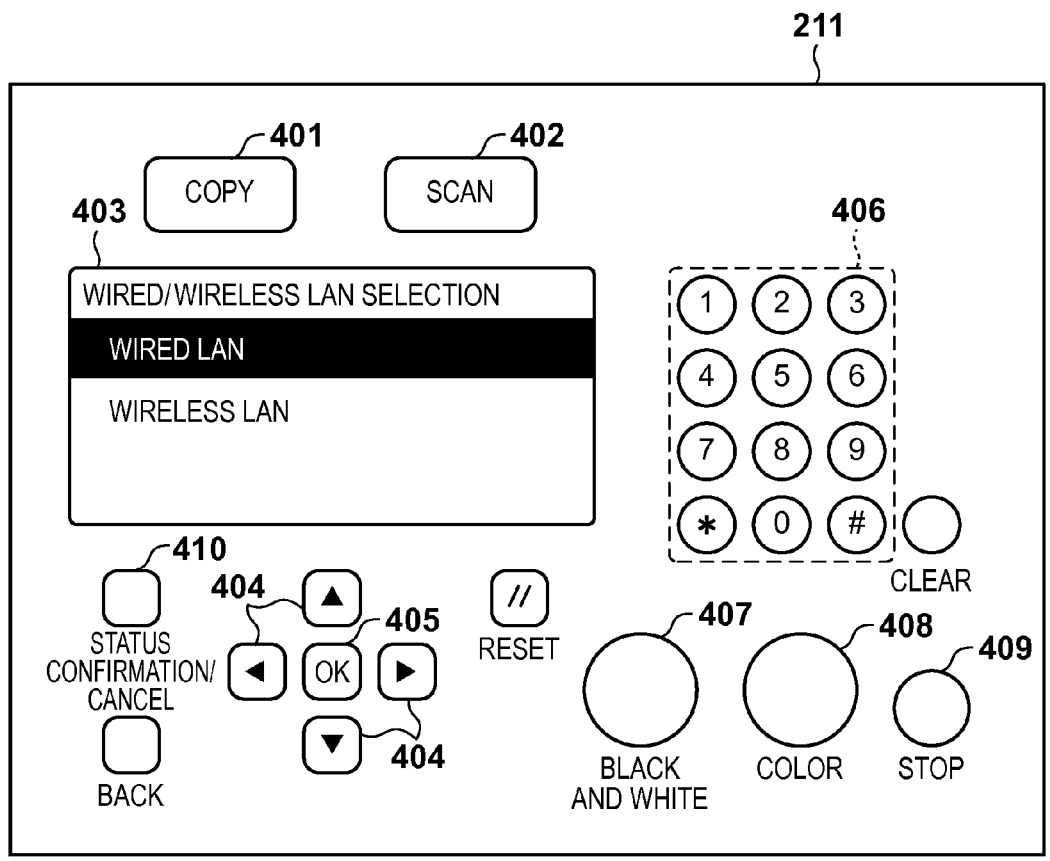
FIG. 4A is a plan view illustrating a console in a printing apparatus according to an embodiment of the present invention.

FIG. 4A illustrates an example of a state in which the user has navigated the menu hierarchy displayed in the display unit 403 using the arrow keys 404, the OK key 405, and the like, resulting in a menu item for switching between the wired communication mode and the wireless communication modes being displayed in the display unit 403. Two selections, namely "wired LAN" and "wireless LAN", are displayed under a menu item "select wired/wireless LAN". When the user moves the cursor to "wired LAN" using the arrow keys 404 and depresses the OK key 405, the printing apparatus 100 begins operating in the wired communication mode. On the other hand, when the user moves the cursor to "wireless LAN" using the arrow keys 404 and depresses the OK key 405, the printing apparatus 100 begins operating in a wireless communication mode while also displaying a "wireless LAN settings" menu 450, shown in FIG. 4B, in the display unit 403.

Figure 4B:
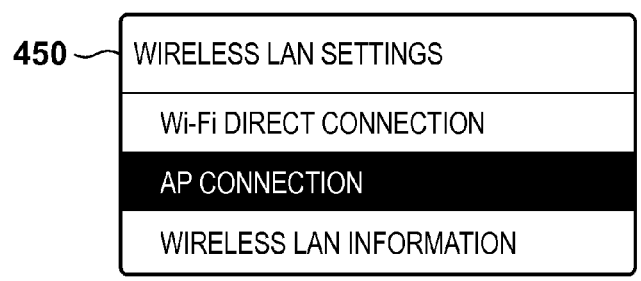
FIG. 4B is a diagram illustrating an example of a "wireless LAN settings" menu screen displayed in a display unit of a console according to an embodiment of the present invention.

Three selections, namely "Wi-Fi Direct connection", "AP connection", and "wireless LAN information", are displayed in the "wireless LAN settings" menu 450 shown in FIG. 4B. When the user moves the cursor to "Wi-Fi Direct connection" using the arrow keys 404 and depresses the OK key 405, the printing apparatus 100 begins operating in the second wireless communication mode. Likewise, when the user moves the cursor to "AP connection" using the arrow keys 404 and depresses the OK key 405, the printing apparatus 100 begins operating in the first wireless communication mode. Finally, when the user moves the cursor to "wireless LAN information" using the arrow keys 404 and depresses the OK key 405, the display in the display unit 403 transitions from the "wireless LAN settings" menu 450 to a screen displaying various types of status information that enable the wireless LAN connection status to be confirmed.

Communication Mode Switching Process

As described above, with the printing apparatus 100 (communication apparatus), a situation can arise where it is desirable to automatically switch the communication mode at an appropriate timing based on an operation state of the printing apparatus itself, regardless of the communication partner or the state of communication with the communication partner. To respond to such a situation, in the embodiments described hereinafter, the printing apparatus 100 automatically switches the communication mode to the first wireless communication mode or the wired communication mode based on the operation state of the printing apparatus 100 in the case where the communication mode is set to the second wireless communication mode.

Specifically, the printing apparatus 100 controls communication with the external apparatus using the first wireless communication mode (or wired communication mode) or the second wireless communication mode, which have been set through user operations or the like using the console 211 as described above. In the case where the communication mode is set to the second wireless communication mode, the printing apparatus 100 switches the communication mode to the first wireless communication mode (or the wired communication mode) when the operation state of the communication apparatus shifts from a given state (a first state) to another state (a second state). In other words, the printing apparatus automatically switches the communication mode from the second wireless communication mode to the first wireless communication mode (or the wired communication mode) at a timing at which a specific change occurs in the operation state of the printing apparatus. This timing corresponds to, for example, a timing at which it is desirable for the user who has switched the communication mode to the second wireless communication mode and is using the printing apparatus 100 in the second wireless communication mode to carry out an operation for returning the communication mode to its original settings. Automatically switching the communication mode in this manner makes it possible to avoid a state in which, for example, a user is rendered unable to use the printing apparatus 100 in the first wireless communication mode or the like because another user who had been using the wireless communication mode has forgotten to switch the communication mode settings.

Hereinafter, four specific examples of this processing will be described in order as first to fourth embodiments. Note that in the embodiments described hereinafter, the "first wireless communication mode" and the "wired communication mode" are examples of a first communication mode in which communication is carried out with the external apparatus without connecting directly to the external apparatus. On the other hand, the "second wireless communication mode" is an example of a second communication mode in which communication is carried out with the external apparatus by wirelessly connecting to the external apparatus directly.

First Embodiment

A first embodiment describes a case where the operation state of the printing apparatus 100 shifts from the normal power state (a non-power saving state) to a power saving state (for example, a sleep state) in which the printing apparatus 100 consumes a lower amount of power than in the normal power state. In the present embodiment, the normal power state (a first state) is the non-power saving state, and corresponds to a normal operation state in which power is supplied to a plurality of devices provided in the printing apparatus 100. On the other hand, the power saving state (a second state) corresponds to a state in which the power consumed by the printing apparatus 100 is reduced by supplying power only to some of the stated plurality of devices.

Hereinafter, a process for switching the communication mode according to the present embodiment, executed by the printing apparatus 100, will be described with reference to the flowchart shown in FIG. 5. Note that the printing apparatus 100 implements the processes in each step shown in FIG. 5 by the CPU 202 reading out a control program stored in the ROM 204 or the HDD 214 into the RAM 203 and executing that control program.

First, in S501, the CPU 202 (the power control unit 313) determines whether or not to shift the operation state to the power saving state, while the printing apparatus 100 is in the normal operation state. For example, in the case where the printing apparatus 100 has remained in an idle state for a predetermined amount of time and the user has instructed the printing apparatus 100 to shift to the power saving state via the console 211, the CPU 202 determines to shift the operation state to the power saving state. When the CPU 202 has determined in S501 not to shift the operation state to the power saving state, the determination process of S501 is repeated; when the CPU 202 has determined to shift to the power saving state, the process advances to S502.

In S502, the CPU 202 (the communication control unit 303) determines whether or not the current communication mode is the second wireless communication mode. In the case where the CPU 202 has determined that the current communication mode is not the second wireless communication mode (that is, is the wired communication mode or the first wireless communication mode), the process advances to S506. In S506, the CPU 202 shifts the operation state of the printing apparatus 100 from the normal operation state to the power saving state without changing the communication mode settings, after which the process ends.

However, in the case where the CPU 202 has determined in S502 that the current communication mode is the second wireless communication mode, the process advances to S503. In S503 to S505, the CPU 202 (the mode switching unit 302) performs a process for switching the communication mode. First, the CPU 202 (the mode switching unit 302) sends an end command to the second wireless communication mode control unit 306. Upon receiving the end command, the second wireless communication mode control unit 306 executes a process for ending the second wireless communication mode in S503, and when the ending process is complete, notifies the mode switching unit 302 that the ending process is complete.

Next, in S504, the CPU 202 (the mode switching unit 302) changes a communication mode setting value saved in the HDD 214 or the like by the storage unit 301 to "wired communication mode" or "first wireless communication mode". The CPU 202 may change the communication mode setting value so that, for example, the communication mode is returned to the communication mode used prior to switching to the second wireless communication mode. In other words, in the case where the communication mode setting value was "wired communication mode" prior to the value being changed to "second wireless communication mode", the CPU 202 may change the communication mode setting value to "wired communication mode". On the other hand, in the case where the communication mode setting value was "first wireless communication mode" prior to the value being changed to "second wireless communication mode", the CPU 202 may change the communication mode setting value to "first wireless communication mode".

After this, in S505, the CPU 202 (the mode switching unit 302) sends an activation command to the wired communication mode controller 308 in the case where the communication mode is to be switched to the wired communication mode, or to the first wireless communication mode control unit 305 in the case where the communication mode is to be switched to the first wireless communication mode. As a result, the wired communication mode control unit 308 or the first wireless communication mode controller 305 that has received the activation command executes an activation process for the corresponding communication mode. When the activation process is complete, the wired communication mode control unit 308 or the first wireless communication mode controller 305 notifies the CPU 202 (the mode switching unit 302) that the activation process is complete.

After completing the communication mode switch from the second wireless communication mode to the first wireless communication mode or the wired communication mode through the processes of S503 to S505, in S506, the CPU 202 (the power control unit 313) shifts the operation state of the printing apparatus 100 from the normal operation state to the power saving state. After this, the CPU 202 ends the process.

As described thus far, according to the present embodiment, the printing apparatus 100 can be prevented from shifting from the normal operation state to the power saving state while still in the second wireless communication mode (Wi-Fi Direct). It is thus possible to avoid a situation in which the mobile terminal of a user using the first wireless communication mode (infrastructure mode) or the wired communication mode can no longer connect to the printing apparatus 100, even if the printing apparatus 100 shifts to the power saving state. Therefore, according to the present embodiment, it is possible to automatically switch the communication mode of the printing apparatus 100 at an appropriate timing based on the operation state of the printing apparatus 100 itself.

Variation on First Embodiment

The aforementioned first embodiment can be varied in a variety of ways. For example, in the printing apparatus 100, whether or not to actually automatically switch the communication mode based on the operation state of the printing apparatus 100 may be set based on an operation input performed by the user, and the switching of the communication mode may be controlled based on that setting. This makes it possible to improve the convenience for the user. An example in which such control has been added will be described hereinafter as a variation on the first embodiment.

Figure 10A:
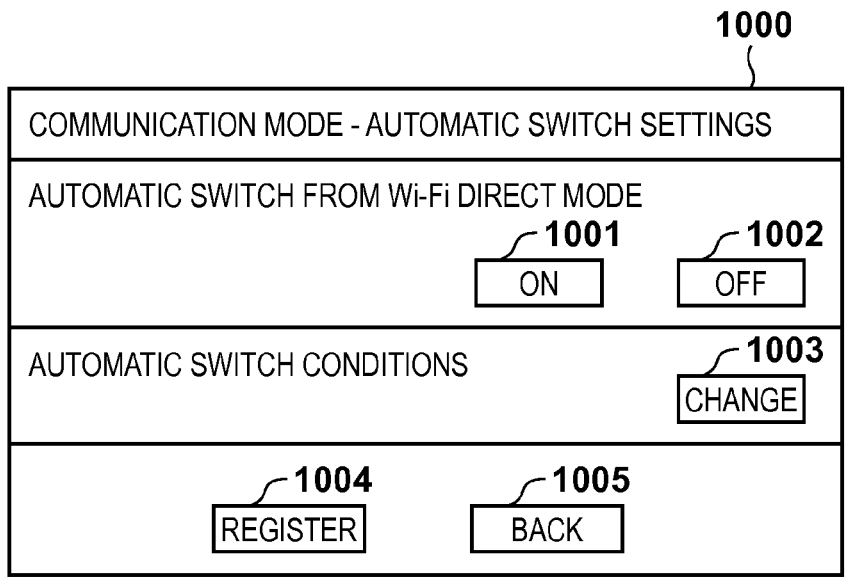
FIGS. 10A and 10B are diagrams illustrating an example of a communication mode automatic switch settings screen according to a variation on the first embodiment.
Figure 10B:
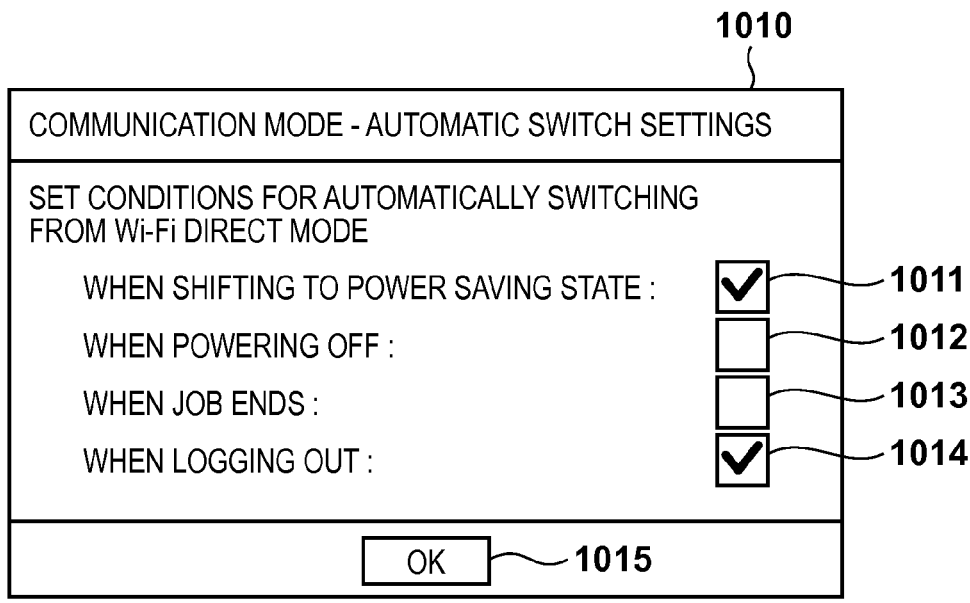

FIGS. 10A and 10B are diagrams illustrating an example of a communication mode automatic switch settings screen. A settings screen 1000 shown in FIG. 10A is displayed in the display unit 403 of the console 211 in response to an operation made by the user through the console 211. When the user manipulates a change button 1003 in the settings screen 1000, the display in the display unit 403 transitions to a settings screen 1010, shown in FIG. 10B. The user can make settings regarding the automatic switching of the communication mode using the settings screens 1000 and 1010.

In the case where the printing apparatus 100 is operating in the first wireless communication mode, when the user presses a button 1002 in the settings screen 1000, the printing apparatus 100 is set to continue operating in the first wireless communication mode as long as the user does not perform an operation for switching the communication mode. However, when the user presses a button 1001, a setting for automatically switching from the first wireless communication mode is activated. Meanwhile, when the user manipulates the change button 1003, the display in the display unit 403 transitions from the settings screen 1000 to the settings screen 1010.

When the user presses check boxes 1011 to 1014 in the settings screen 1010, the check boxes toggle between displaying and removing check marks. When check marks are displayed in the check boxes 1011 to 1014, conditions corresponding to those check boxes are active. For example, FIG. 10B shows settings for automatically switching the printing apparatus 100 from the second wireless communication mode to the first wireless communication mode or the wired communication mode when shifting to the power saving state and when logging out (as will be described later in a third embodiment). When the user manipulates a button 1015, the display in the display unit 403 returns to the settings screen 1000 from the settings screen 1010. When a button 1004 is pressed in the settings screen 1000, the printing apparatus 100 registers the settings for automatically switching from the second wireless communication mode and records corresponding setting values in a memory such as the HDD 214.

Next, a process for switching the communication mode according to the present variation, executed by the printing apparatus 100, will be described with reference to the flowchart shown in FIG. 11. Note that the printing apparatus 100 implements the processes in each step shown in FIG. 11 by the CPU 202 reading out a control program stored in the ROM 204 or the HDD 214 into the RAM 203 and executing that control program. To simplify the descriptions, steps that execute the same processes as those described above with reference to FIG. 5 have been given the same reference numerals as in FIG. 5, and descriptions thereof will be omitted.

Figure 5:
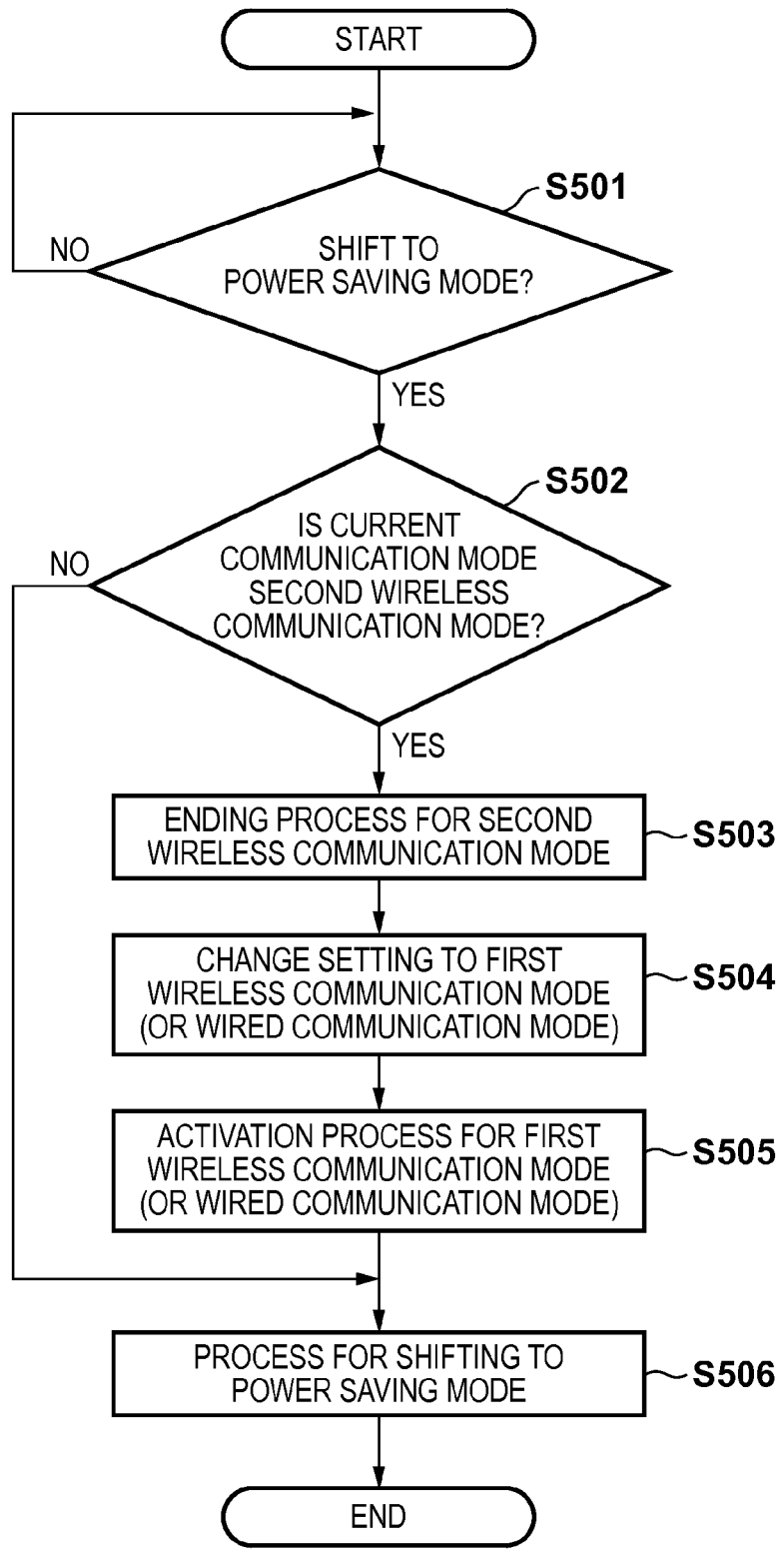
FIG. 5 is a flowchart illustrating a process for switching a communication mode according to a first embodiment.
Figure 11:
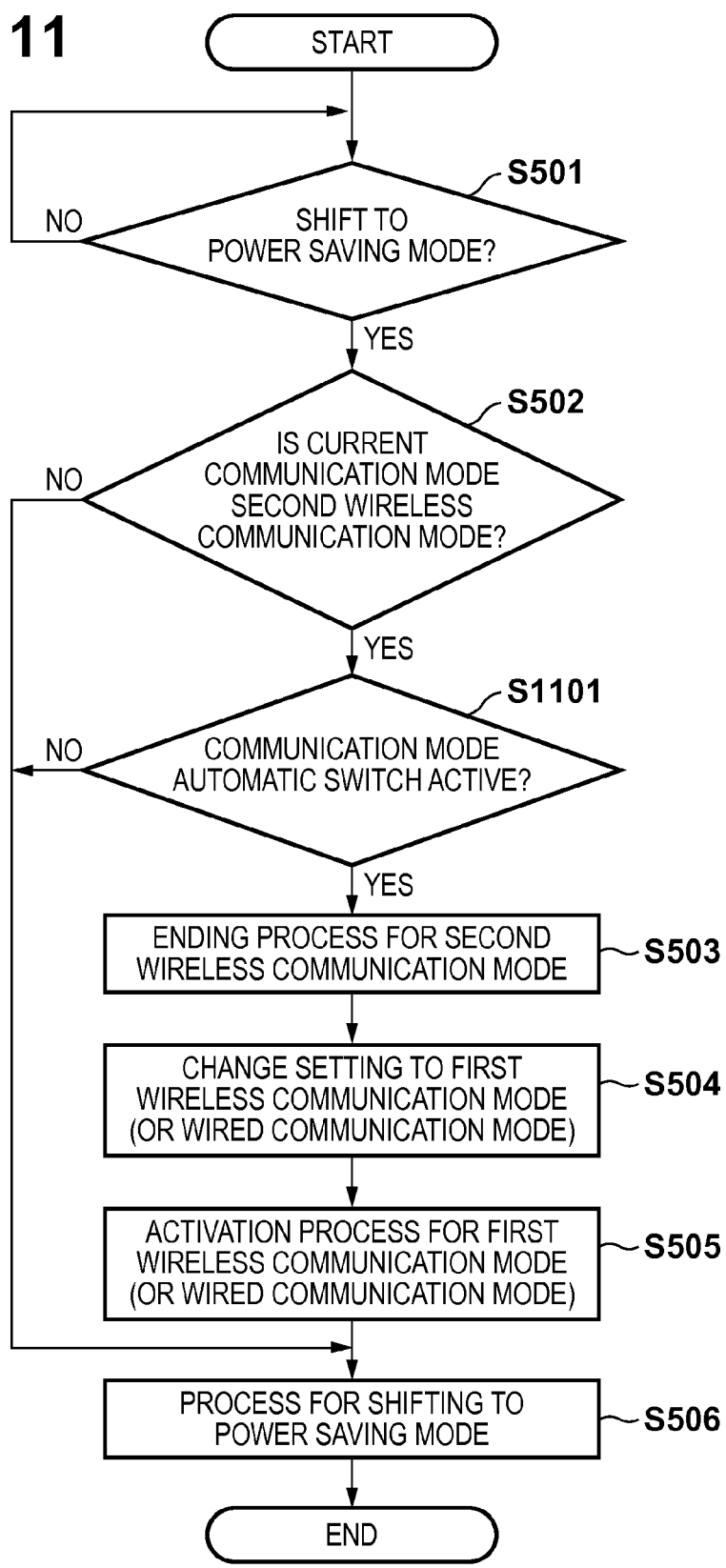
FIG. 11 is a flowchart illustrating a process for switching a communication mode according to a variation on the first embodiment.

FIG. 11 is different from FIG. 5 in that the process of S1101 has been added. In the present variation, in the case where the CPU 202 has determined in S502 that the current communication mode is the second wireless communication mode, the process advances to S1101. In S1101, the CPU 202 determines whether or not a setting for automatically switching the communication mode when the printing apparatus 100 shifts to the power saving state (1011 in FIG. 10B) is active. In the case where the CPU 202 has determined that the setting for automatically switching the communication mode is not active, the process advances to S506, where the CPU 202 shifts the operation state of the printing apparatus 100 from the normal operation state to the power saving state without changing the communication mode settings, after which the process ends. However, in the case where the CPU 202 has determined that the setting for automatically switching the communication mode is active, the process advances to S503. The processing from S503 on is the same as that shown in FIG. 5.

As described thus far, according to the present variation, whether or not to automatically switch the communication mode from the second wireless communication mode to the first wireless communication mode (or the wired communication mode) when the printing apparatus 100 shifts to the power saving state is controlled based on user settings. Through this, the communication mode can be automatically switched having taken into consideration the user's preferences, thus making it possible to further improve the convenience for the user.

Second Embodiment

If, for example, a power switch (not shown) is switched off while the printing apparatus 100 is operating in a state where the communication mode is set to the second wireless communication mode (Wi-Fi Direct), the printing apparatus 100 shifts from an activated state to a shut down state. In this case, if the power switch of the printing apparatus 100 is then turned on, the printing apparatus 100 will be activated in a state in which the communication mode is the second wireless communication mode (Wi-Fi Direct). In other words, a situation can arise in which a user who has connected to and is using the printing apparatus 100 in the first wireless communication mode is rendered unable to use the printing apparatus 100 until the communication mode of the printing apparatus 100 is returned to the first wireless communication mode from the second wireless communication mode.

Accordingly, a second embodiment describes an example in which the communication mode is automatically switched as necessary in the case where the operation state of the printing apparatus 100 shifts from an activated state (a first state) to the shut down state (a second state) (that is, is turned off).

Hereinafter, a process for switching the communication mode according to the present embodiment, executed by the printing apparatus 100, will be described with reference to the flowchart shown in FIG. 6. Note that the printing apparatus 100 implements the processes in each step shown in FIG. 6 by the CPU 202 reading out a control program stored in the ROM 204 or the HDD 214 into the RAM 203 and executing that control program.

First, in S601, the CPU 202 (the power control unit 313) determines whether or not to shift the operation state of the printing apparatus 100 to the shut down state. The CPU 202 determines to shift to the shut down state in, for example, the case where a pre-set time at which the printing apparatus 100 is to be turned off has been reached, the case where the user has depressed a specific button in the console 211, the case where the user has manipulated the power switch of the printing apparatus 100 (not shown), or the like. When the CPU 202 has determined in S601 not to shift the operation state to the shut down state, the determination process of S601 is repeated; when the CPU 202 has determined to shift to the shut down state, the process advances to S602.

In S602, the CPU 202 (the communication control unit 303) determines whether or not the current communication mode is the second wireless communication mode. In the case where the CPU 202 has determined that the current communication mode is not the second wireless communication mode (that is, is the wired communication mode or the first wireless communication mode), the process advances to S604. In S604, the CPU 202 shifts the operation state of the printing apparatus 100 to the shut down state without changing the communication mode settings, after which the process ends.

However, in the case where the CPU 202 has determined in S602 that the current communication mode is the second wireless communication mode, the process advances to S603. In S603, the CPU 202 (the mode switching unit 302) changes the communication mode setting value saved in the HDD 214 or the like by the storage unit 301 to "wired communication mode" or "first wireless communication mode", in the same manner as in S504. Thereafter, in S604, the CPU 202 (the power control unit 313) shifts the operation state of the printing apparatus 100 to the shut down state, after which the process ends.

As described thus far, according to the present embodiment, the printing apparatus 100 can be prevented from shifting to the shut down state while still in the second wireless communication mode (Wi-Fi Direct). Accordingly, when the printing apparatus 100 is turned on, the printing apparatus 100 is activated in a state in which the communication mode is set to the first wireless communication mode (infrastructure mode) or the wired communication mode. In other words, it is possible to avoid a situation in which the mobile terminal of a user using the first wireless communication mode (infrastructure mode) or the wired communication mode cannot connect to the printing apparatus 100 when the printing apparatus 100 shifts to the shut down state and is then activated once again.

Variation on Second Embodiment

The aforementioned second embodiment can also be varied in a variety of ways. Hereinafter, an example will be described in which the printing apparatus 100 is set to determine whether or not to actually automatically switch the communication mode as described in the second embodiment based on an operation input performed by the user, and the switching of the communication mode is controlled based on that setting.

Hereinafter, a process for switching the communication mode according to the present variation, executed by the printing apparatus 100, will be described with reference to the flowchart shown in FIG. 12. Note that the printing apparatus 100 implements the processes in each step shown in FIG. 12 by the CPU 202 reading out a control program stored in the ROM 204 or the HDD 214 into the RAM 203 and executing that control program. To simplify the descriptions, steps that execute the same processes as those described above with reference to FIG. 6 have been given the same reference numerals as in FIG. 6, and descriptions thereof will be omitted.

Figure 6:
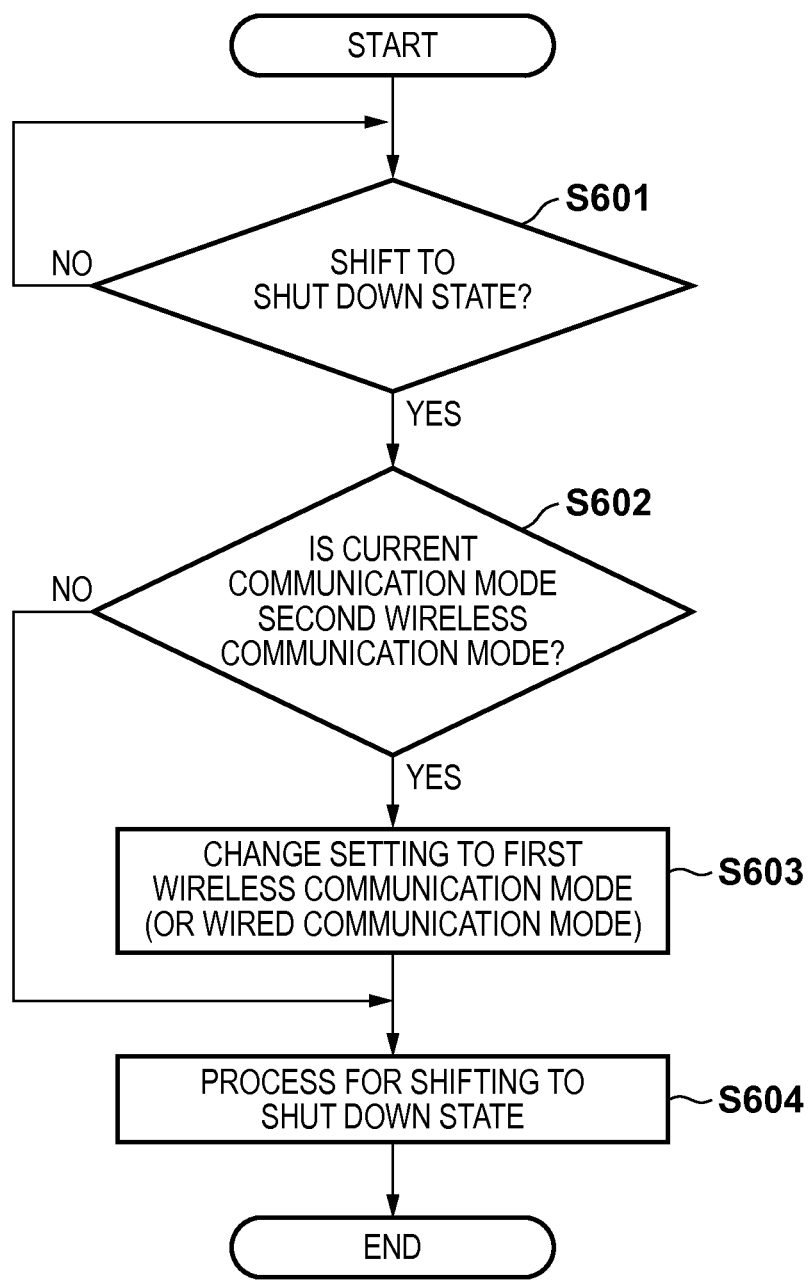
FIG. 6 is a flowchart illustrating a process for switching a communication mode according to a second embodiment.
Figure 12:
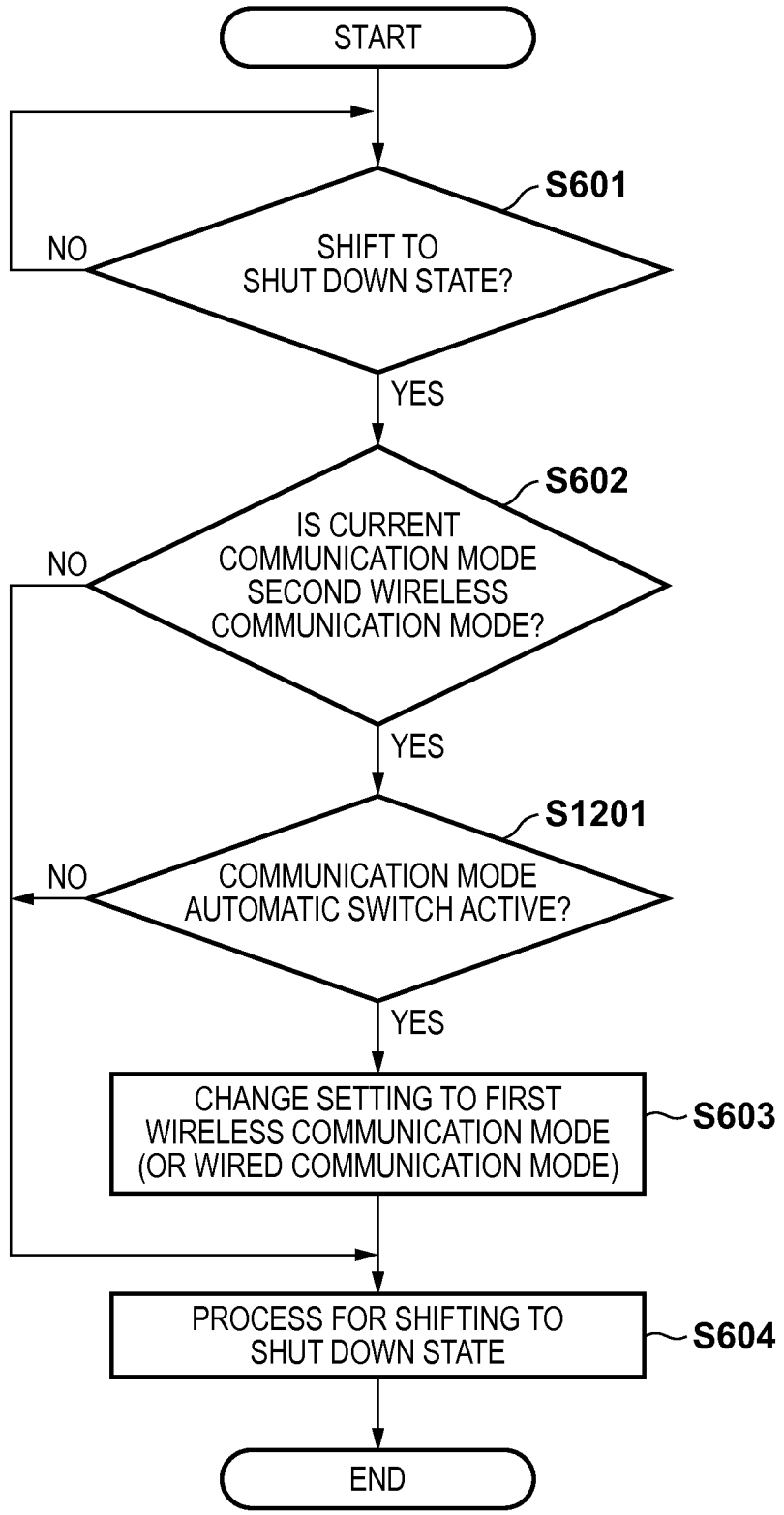
FIG. 12 is a flowchart illustrating a process for switching a communication mode according to a variation on the second embodiment.

FIG. 12 is different from FIG. 6 in that the process of S1201 has been added. In the present variation, in the case where the CPU 202 has determined in S602 that the current communication mode is the second wireless communication mode, the process advances to S1201. In S1201, the CPU 202 determines whether or not a setting for automatically switching the communication mode when the printing apparatus 100 shifts to the shut down state (1012 in FIG. 10B) is active. In the case where the CPU 202 has determined that the setting for automatically switching the communication mode is not active, the process advances to S604, where the CPU 202 shifts the operation state of the printing apparatus 100 to the shut down state without changing the communication mode settings, after which the process ends. However, in the case where the CPU 202 has determined that the setting for automatically switching the communication mode is active, the process advances to S603. The processing from S603 on is the same as that shown in FIG. 6.

As described thus far, according to the present variation, whether or not to automatically switch the communication mode from the second wireless communication mode to the first wireless communication mode (or the wired communication mode) when the printing apparatus 100 shifts to the shut down state is controlled based on user settings. Through this, the communication mode can be automatically switched having taken into consideration the user's preferences, thus making it possible to further improve the convenience for the user.

Third Embodiment

As described above, the printing apparatus 100 includes an authentication function for permitting the printing apparatus 100 to be operated by a user whose login authentication has succeeded. Normally, only users whose login authentications have succeeded can operate the console 211 of the printing apparatus 100 and, by extension, the printing apparatus 100 itself. When the user completes a desired task using the console 211 and a logout process is performed for that user, that user is once again rendered unable to operate the console 211. Such login authentication is carried out by, for example, providing a card reader in the printing apparatus 100 and using card-based authentication, accepting the input of a username and a password, or the like.

In the case where the printing apparatus 100 includes such an authentication function, the user can log into the printing apparatus 100, switch the communication mode of the printing apparatus from the first wireless communication mode to the second wireless communication mode (Wi-Fi Direct), and perform desired tasks. However, when logging out of the printing apparatus 100, it is possible that the user will log out without returning the communication mode from the second wireless communication mode to the first wireless communication mode. In other words, a situation can arise in which a user who has connected to and is using the printing apparatus 100 in the first wireless communication mode is rendered unable to use the printing apparatus 100 until the communication mode of the printing apparatus 100 is returned to the first wireless communication mode or the like.

Accordingly, the third embodiment describes a case where after the user has logged into the printing apparatus 100 and entered a state in which the printing apparatus 100 can be operated (a first state) and a process for logging that user out has been completed, the operation state of the printing apparatus 100 shifts from the first state to a state in which that user cannot operate the printing apparatus 100 (a second state). In other words, the present embodiment describes an example in which the communication mode of the printing apparatus 100 is automatically switched as necessary in such a case.

Hereinafter, a process for switching the communication mode according to the present embodiment, executed by the printing apparatus 100, will be described with reference to the flowchart shown in FIG. 7. Note that the printing apparatus 100 implements the processes in each step shown in FIG. 7 by the CPU 202 reading out a control program stored in the ROM 204 or the HDD 214 into the RAM 203 and executing that control program.

First, in S701, the CPU 202 (the authentication control unit 314) stands by for a user of the printing apparatus 100 to carry out login authentication. The CPU 202 reads user login information received through the console 211 or an external card reader, verifies that information against user login information saved in the HDD 214 or the like by the storage unit 301, and determines whether or not to allow the user to log in. In the case where no user is logged into the printing apparatus 100, no users can operate the console 211.

In the case where the CPU 202 determines in S701 that the user login authentication has succeeded, the process advances to S702, and a login process is executed. The user thus becomes able to operate the console 211 and can perform desired tasks using the printing apparatus 100.

Next, in S703, the CPU 202 (the mode switching unit 302) determines whether or not to switch the communication mode to the second wireless communication mode (Wi-Fi Direct) based on an operation input made by the user through the console 211. When the CPU 202 determines not to switch the communication mode to the second wireless communication mode, the process advances to S710, where a service process instructed by the user is executed; thereafter, in S712, it is determined whether or not to execute a user logout process. Here, when the CPU 202 determines to execute the user logout process based on an operation input from the user, the process advances to S709, where the logout process is carried out for that user; after this, the processing ends.

On the other hand, when the CPU 202 determines in S703 to switch the communication mode to the second wireless communication mode, the process advances to S704. In S704, the CPU 202 (the mode switching unit 302) executes a process for switching the communication mode to the second wireless communication mode. Thereafter, in S705, the CPU 202 executes a service process instructed by the user, after which the process advances to S706.

In S706, the CPU 202 (the mode switching unit 302) determines whether or not to switch the communication mode to the first wireless communication mode or the wired communication mode based on an operation input made by the user through the console 211. Normally, the user will return the communication mode from the second wireless communication mode to the original communication mode and instruct the logout process to be executed. When the CPU 202 determines in S706 to switch the communication mode to the first wireless communication mode or the wired communication mode, the process advances to S711, where a process for switching the communication mode to the first wireless communication mode or the wired communication mode is executed. After this, it is determined in S712 whether or not to execute the user logout process. Here, when the CPU 202 determines to execute the user logout process based on an operation input from the user, the process advances to S709, where the logout process is carried out for that user; after this, the processing ends. The console 211 enters an inoperable state as a result. However, because the printing apparatus 100 is operating in a state in which the first wireless communication mode (infrastructure mode) or the wired communication mode is set, users who are using those communication modes can operate the printing apparatus 100.

On the other hand, when the CPU 202 determines in S706 not to switch the communication mode to the first wireless communication mode or the wired communication mode, the process advances to S707. This determination result corresponds to a case where the user has instructed the logout process to be executed having forgotten to switch the communication mode. When the CPU 202 determines in S707 to execute the user logout process based on an operation input from the user, the process advances to S708. In S708, the CPU 202 (the mode switching unit 302) executes a process for switching the communication mode from the second wireless communication mode to the first wireless communication mode or the wired communication mode. Thereafter, in S709, the CPU 202 executes the logout process for the user who instructed the logout process to be executed, after which the processing ends. The console 211 enters an inoperable state as a result. However, because the printing apparatus 100 is operating in a state in which the first wireless communication mode (infrastructure mode) or the wired communication mode is set, users who are using those communication modes can operate the printing apparatus 100.

According to the present embodiment, even in the case where a user who has logged into the printing apparatus 100 instructs the logout process to be executed while the communication mode remains set to the second wireless communication mode (Wi-Fi Direct), the communication mode is returned to the original mode automatically before the logout process is executed. As a result, it is possible to avoid a situation in which the mobile terminal of a user using the first wireless communication mode (infrastructure mode) or the wired communication mode cannot connect to the printing apparatus 100 after a user who was using the second wireless communication mode has logged out.

Variation on Third Embodiment

The aforementioned third embodiment can also be varied in a variety of ways. Hereinafter, an example will be described in which the printing apparatus 100 is set to determine whether or not to actually automatically switch the communication mode as described in the third embodiment based on an operation input performed by the user, and the switching of the communication mode is controlled based on that setting.

Hereinafter, a process for switching the communication mode according to the present variation, executed by the printing apparatus 100, will be described with reference to the flowchart shown in FIG. 13. Note that the printing apparatus 100 implements the processes in each step shown in FIG. 13 by the CPU 202 reading out a control program stored in the ROM 204 or the HDD 214 into the RAM 203 and executing that control program. To simplify the descriptions, steps that execute the same processes as those described above with reference to FIG. 7 have been given the same reference numerals as in FIG. 7, and descriptions thereof will be omitted.

Figure 7:
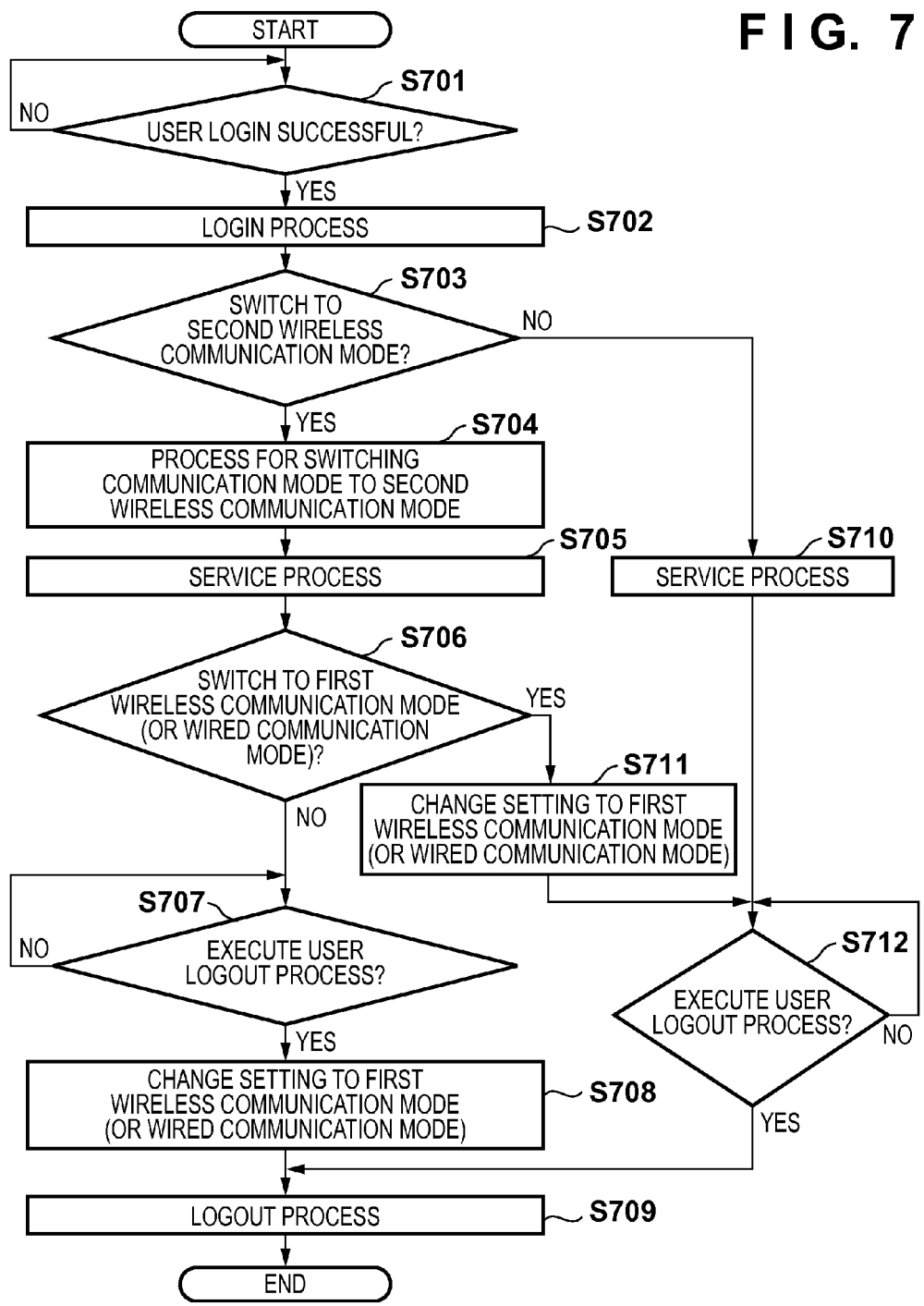
FIG. 7 is a flowchart illustrating a process for switching a communication mode according to a third embodiment.
Figure 13:
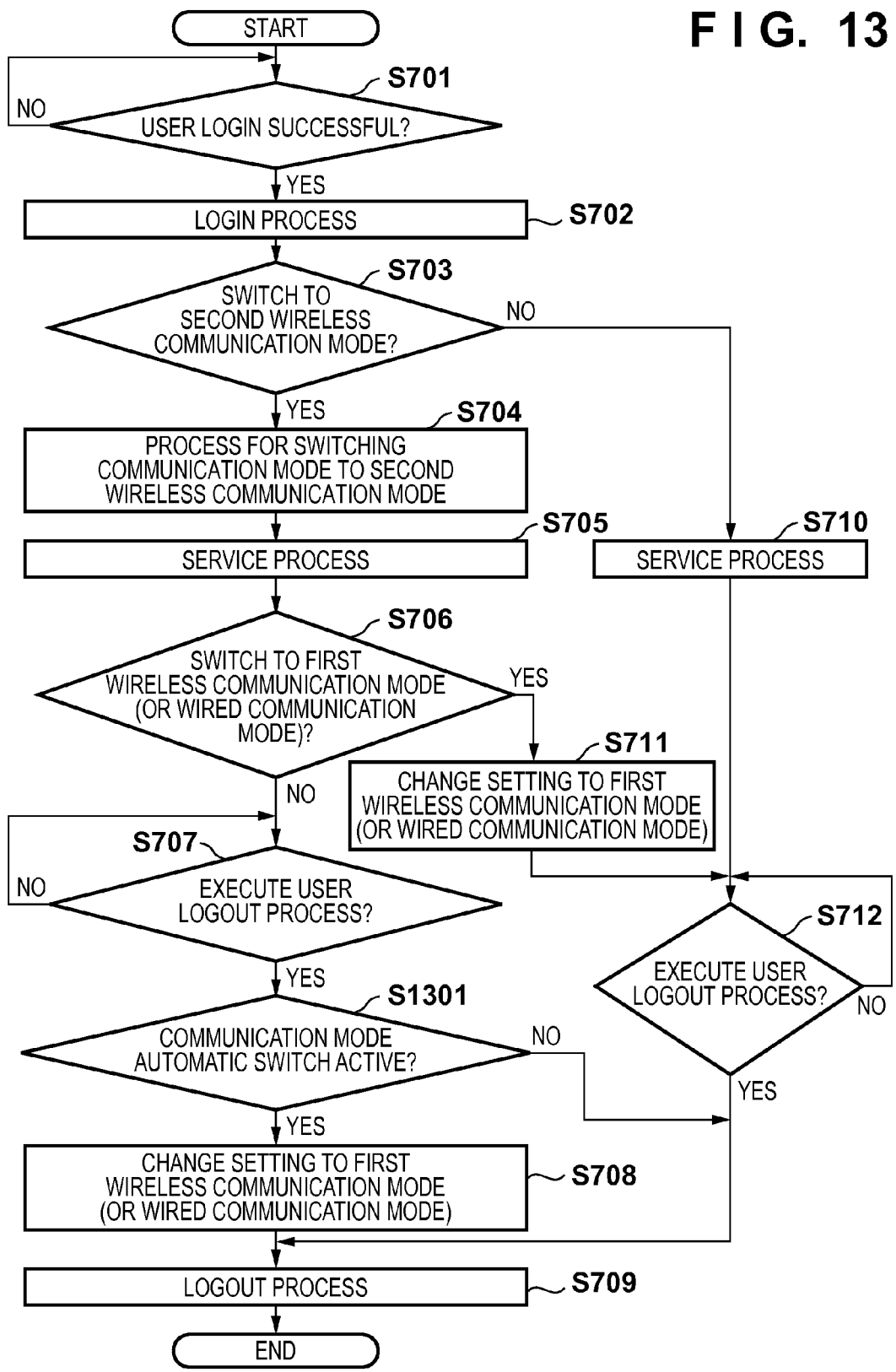
FIG. 13 is a flowchart illustrating a process for switching a communication mode according to a variation on the third embodiment.

FIG. 13 is different from FIG. 7 in that the process of S1301 has been added. In the present variation, when the CPU 202 determines in S707 to execute the user logout process based on an operation input from the user, the process advances to S1301. In S1301, the CPU 202 determines whether or not a setting for automatically switching the communication mode when executing the logout process (1014 in FIG. 10B) is active. In the case where the CPU 202 has determined that the setting for automatically switching the communication mode is inactive, the process advances to S709. In S709, the CPU 202 executes the logout process for the user who instructed the logout process to be executed without changing the communication mode setting, after which the processing ends.

However, in the case where the CPU 202 has determined in S1301 that the setting for automatically switching the communication mode when executing the logout process is active, the process advances to S708. The processing from S708 on is the same as that shown in FIG. 7.

As described thus far, according to the present variation, whether or not to automatically switch the communication mode from the second wireless communication mode to the first wireless communication mode (or the wired communication mode) when the printing apparatus 100 executes the logout process for a logged-in user is controlled based on user settings. Through this, the communication mode can be automatically switched having taken into consideration the user's preferences, thus making it possible to further improve the convenience for the user.

Fourth Embodiment

A fourth embodiment describes an example in which the communication mode is automatically switched as necessary in the case where the operation state of the printing apparatus 100 shifts from a state in which a job is being executed (a first state) to a state in which the execution of the job is complete (a second state).

Figure 8:
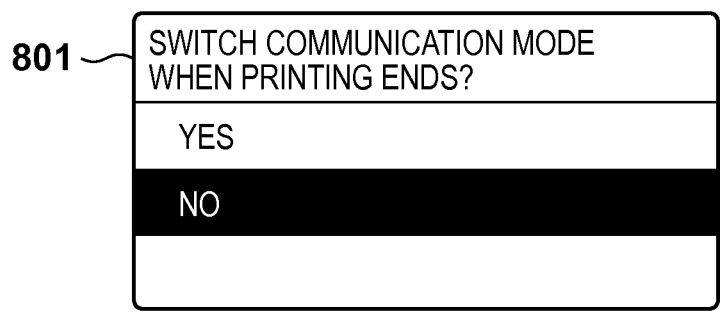
FIG. 8 is a diagram illustrating an example of a communication mode switch settings screen according to a fourth embodiment.

FIG. 8 is a diagram illustrating an example of a communication mode switch settings screen according to the present embodiment. A settings screen 801 is displayed in the display unit 403 of the console 211 in response to an operation made by the user through the console 211. In the settings screen 801, the user can set whether or not to automatically switch the communication mode when the execution of a printing process (a print job) has been completed by the printing apparatus 100 when operating in the second wireless communication mode (Wi-Fi Direct). In other words, the user can set whether or not to automatically switch the communication mode from the second wireless communication mode to the first wireless communication mode (infrastructure mode) or the wired communication mode.

Hereinafter, a process for switching the communication mode according to the present embodiment, executed by the printing apparatus 100, will be described with reference to the flowchart shown in FIG. 9. Note that the printing apparatus 100 implements the processes in each step shown in FIG. 9 by the CPU 202 reading out a control program stored in the ROM 204 or the HDD 214 into the RAM 203 and executing that control program.

First, in S901, the CPU 202 (the printing control unit 315) determines whether or not a printing process being executed by the printer 207 has ended by communicating with the printer 207 via the printer I/F 206. When the CPU 202 determines in S901 that the printing process has not ended, the determination process of S901 is repeated; when it is determined that the printing process has ended, the process advances to S902.

In S902, the CPU 202 (the communication control unit 303) determines whether or not the current communication mode is the second wireless communication mode. In the case where the CPU 202 has determined that the current communication mode is not the second wireless communication mode (that is, is the wired communication mode or the first wireless communication mode), the process ends without changing the communication mode setting. However, in the case where the CPU 202 has determined in S902 that the current communication mode is the second wireless communication mode, the process advances to S903.

In S903, the CPU 202 (the communication control unit 303) determines whether or not the communication mode has been set to be switched when the printing ends. When the CPU 202 determines that the communication mode has not been set to be switched using the settings screen 801, the process ends without changing the communication mode setting. On the other hand, when the CPU 202 determines that the communication mode has been set to be switched, the process advances to S904.

In S904 to S906, the CPU 202 (the mode switching unit 302) performs a process for switching the communication mode, in the same manner as in S503 to S505. First, the CPU 202 (the mode switching unit 302) sends an end command to the second wireless communication mode control unit 306. Upon receiving the end command, the second wireless communication mode control unit 306 executes a process for ending the second wireless communication mode in S904, and when the ending process is complete, notifies the mode switching unit 302 that the ending process is complete.

Next, in S905, the CPU 202 (the mode switching unit 302) changes the communication mode setting value saved in the HDD 214 or the like by the storage unit 301 to "wired communication mode" or "first wireless communication mode", in the same manner as in S504. After this, in S906, the CPU 202 (the mode switching unit 302) sends an activation command to the wired communication mode controller 308 in the case where the communication mode is to be switched to the wired communication mode, or to the first wireless communication mode control unit 305 in the case where the communication mode is to be switched to the first wireless communication mode. As a result, the wired communication mode control unit 308 or the first wireless communication mode controller 305 that has received the activation command executes an activation process for the corresponding communication mode. When the activation process is complete, the wired communication mode control unit 308 or the first wireless communication mode controller 305 notifies the CPU 202 (the mode switching unit 302) that the activation process is complete. After this, the CPU 202 ends the process.

According to the present embodiment, the printing apparatus 100 automatically executes a process for switching the communication mode when the execution of a printing process (a print job) has been completed by the printing apparatus 100 operating in the second wireless communication mode (Wi-Fi Direct). As a result, it is possible to avoid a situation in which the mobile terminal of a user using the first wireless communication mode (infrastructure mode) or the wired communication mode cannot connect to the printing apparatus 100 after the execution of a printing process has been completed.

Other Embodiments

Although the aforementioned embodiments describe examples in which Wi-Fi Direct serves as the second wireless communication mode, the present invention is not limited to Wi-Fi Direct. Any type of wireless communication can be employed as the second wireless communication mode as long as it enables a given apparatus to directly connect to another apparatus through wireless communication.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054142, filed Mar. 15, 2013, which is hereby incorporated by reference herein in its entirety.

What is claimed is:

1. A communication apparatus which is capable of operating in a direct wireless communication mode for performing direct wireless communication with an external apparatus, the communication apparatus comprising:
   a memory storing a program, and;
   a processor that executes the program stored in the memory to implement:
      a processing unit configured to perform a login process for allowing a user to log in to the communication apparatus,
      an accepting unit configured to accept, from a user, an operation instruction to instruct the communication apparatus to start operating in the direct wireless communication mode, and
      a controlling unit configured to, when the accepting unit accepts the operation instruction, control the communication apparatus to start operating in the direct wireless communication mode,
   wherein when the user logs out of the communication apparatus, the controlling unit controls the communication apparatus to end operating in the direct wireless communication mode.

2. The communication apparatus according to claim 1, wherein when the user logs out of the communication apparatus, the controlling unit controls the communication apparatus to end operating in the direct wireless communication mode and to start operating in a wired communication mode for performing communication with an external apparatus via a wired interface.

3. The communication apparatus according to claim 1, wherein when the user logs out of the communication apparatus, the controlling unit controls the communication apparatus to end operating in the direct wireless communication mode and to start operating in an infrastructure mode for performing wireless communication with an external apparatus via an access point.

4. The communication apparatus according to claim 1, wherein the processor also executes the program stored in the memory to implement:
   a displaying unit configured to display an instruction screen for allowing the user to instruct the communication apparatus to start operating in the direct wireless communication mode,
   wherein the accepting unit accepts the operation instruction from the user via the instruction screen.

5. The communication apparatus according to claim 1, wherein the processor also executes the program stored in the memory to implement:
   a determining unit configured to, when the user logs out of the communication apparatus, determine whether or not to need to end operating in the direct wireless communication mode,
   wherein, in a case where it is determined by the determining unit to need to end operating in the direct wireless communication mode, the controlling unit controls the communication apparatus to end operating in the direct wireless communication mode, and
   in a case where it is determined by the determining unit not to need to end operating in the direct wireless communication mode, the controlling unit controls the communication apparatus to maintain operating in the direct wireless communication mode.

6. The communication apparatus according to claim 5, wherein the processor also executes the program stored in the memory to implement:
   a setting unit configured to set, based on a user's designation, whether or not to end operating in the direct wireless communication mode when the user logs out of the communication apparatus,
   wherein in a case where it has been set by the setting unit to end operating in the direct wireless communication mode when the user logs out of the communication apparatus, the determining unit determines to need to end operating in the direct wireless communication mode, and,
   in a case where it has been set by the setting unit not to end operating in the direct wireless communication mode when the user logs out of the communication apparatus, the determining unit determines not to need to end operating in the direct wireless communication mode.

7. The communication apparatus according to claim 1, wherein the communication apparatus is a printing apparatus which is capable of performing a printing process.

8. The communication apparatus according to claim 1, wherein in a case where the communication apparatus operates in the direct wireless communication mode, one of the communication apparatus and the external apparatus operates as an access point.

9. The communication apparatus according to claim 1, wherein in a case where the communication apparatus operates in the direct wireless communication mode, the communication apparatus performs wireless communication based on Wi-Fi Direct.

10. A control method for controlling a communication apparatus which is capable of operating in a direct wireless communication mode for performing direct wireless communication with an external apparatus, the method comprising steps of:
   performing a login process for allowing a user to log in to the communication apparatus;
   accepting, from a user, an operation instruction to instruct the communication apparatus to start operating in the direct wireless communication mode;
   when the operation instruction is accepted in the accepting step, controlling the communication apparatus to start operating in the direct wireless communication mode so the communication apparatus performs direct wireless communication with the external apparatus; and
   when the user logs out of the communication apparatus, controlling the communication apparatus to end operating in the direct wireless communication mode.

11. A non-transitory computer-readable storage medium storing a computer program for causing a computer to execute steps of a control method for controlling a communication apparatus which is capable of operating in a direct wireless communication mode for performing direct wireless communication with an external apparatus, the method comprising steps of:
- performing a login process for allowing a user to log in to the communication apparatus;
- accepting, from a user, an operation instruction to instruct the communication apparatus to start operating in the direct wireless communication mode;
- when the operation instruction is accepted in the accepting step, controlling the communication apparatus to start operating in the direct wireless communication mode so the communication apparatus performs direct wireless communication with the external apparatus; and
- when the user logs out of the communication apparatus, controlling the communication apparatus to end operating in the direct wireless communication mode.

* * * * *